United States Patent
McCormick

(10) Patent No.: US 11,162,387 B1
(45) Date of Patent: Nov. 2, 2021

(54) MULTI-TEMPERATURE HEAT PUMP FOR THERMAL ENERGY STORAGE

(71) Applicant: Photon Vault LLC, San Ramon, CA (US)

(72) Inventor: Kentwell Lee McCormick, San Ramon, CA (US)

(73) Assignee: PHOTON VAULT, LLC, San Ramon, CA (US)

( * ) Notice: Subject to any disclaimer, the term of this patent is extended or adjusted under 35 U.S.C. 154(b) by 0 days.

(21) Appl. No.: 16/928,352

(22) Filed: Jul. 14, 2020

(51) Int. Cl.
*F01K 3/12* (2006.01)
*F28D 20/00* (2006.01)
*F01K 13/02* (2006.01)
*F24S 60/10* (2018.01)

(52) U.S. Cl.
CPC ........... *F01K 3/12* (2013.01); *F28D 20/00* (2013.01); *F01K 13/02* (2013.01); *F24S 60/10* (2018.05)

(58) Field of Classification Search
CPC ... F01K 3/12; F01K 13/02; F01K 3/00; F28D 20/00; F02C 1/10; F02C 6/14; F02C 6/18; F03G 7/04
See application file for complete search history.

(56) References Cited

U.S. PATENT DOCUMENTS

| | | | |
|---|---|---|---|
| 9,932,830 B2 * | 4/2018 | Laughlin | ............... F01D 1/02 |
| 10,288,357 B2 | 5/2019 | Laughlin et al. | |
| 2012/0060501 A1 * | 3/2012 | Hemrle | ............... F02C 6/18 |
| | | | 60/645 |
| 2014/0060051 A1 * | 3/2014 | Ohler | ............... F01K 25/06 |
| | | | 60/652 |
| 2016/0160864 A1 * | 6/2016 | Becquin | ............... F02C 7/12 |
| | | | 60/645 |
| 2017/0275190 A1 * | 9/2017 | Eziyi | ............... C02F 1/447 |

FOREIGN PATENT DOCUMENTS

EP       2241737       10/2010

OTHER PUBLICATIONS

U.S. Appl. No. 16/945,281, filed Jul. 31, 2020, Thermal Energy Storage and Retrieval Systems and Methods.
U.S. Appl. No. 17/012,621, filed Sep. 4, 2020, Thermal Energy Storage and Retrieval System.

(Continued)

*Primary Examiner* — Shafiq Mian
(74) *Attorney, Agent, or Firm* — Davis Malm D'Agostine, P.C.; David J. Powsner

(57) ABSTRACT

According to some aspects of the invention a heat pump includes first and second heat extraction units to extract heat from first and second heat sources in first and second temperature ranges, respectively, where the second temperature range is, on average, higher than the first temperature range. A fluid via defines a pathway through which the working fluid flows serially from the first heat extraction unit to the second heat extraction unit to the thermal storage unit. A pressure reduction stage is coupled to the via and serially disposed on the fluid circuit between the thermal store and the first heat extraction unit. In addition, either a compressor or a recuperator (or both) are coupled to the via and disposed on the fluid circuit between the first heat extraction unit and the second heat extraction unit.

24 Claims, 10 Drawing Sheets

(56) References Cited

OTHER PUBLICATIONS

U.S. Appl. No. 17/093,063, filed Nov. 9, 2020, Multi-Temperature Heat Collection System.
"Designing a novel solar-assisted heat pump system with modification of a thermal energy storage unit", Proceedings of the Institution of Mechanical Engineers Part A Journal of Power and Energy, May 2019.
"Using Sand and other Small Grained Materials as Heat Storage Medium in a Packed Bed HTTESS", Schlipf et al., Energy Procedia, v. 69, pp. 1029-1038 (2015).
"The Rayleigh-Benard problem in extremely confined geometries with and without the Soret effect," Platten et al., Comptes Rendus Mecanique, Elsevier Masson, 2007, 335 (9-10), pp. 638-654.10.1016/j.crme.2007.08.011.hal-01946148.

* cited by examiner

MULTI-TEMPERATURE HEAT PUMP FOR THERMAL ENERGY STORAGE

FIELD OF THE INVENTION

The invention relates to a multi-temperature heat pump that produces high temperature thermal energy for thermal energy storage.

BACKGROUND OF THE INVENTION

Energy storage is a critical capability for regulating the energy supply. Renewable energy sources are often intermittent and supply either too little or too much power relative to demand. Evening out the supply of energy requires a mechanism to store and retrieve energy. For example, there is often an abundance of electrical energy available during the day due to large amounts of photovoltaic cells. In addition, daytime provides the opportunity to collect heat at various temperatures. But not all heat sources are the same. The unit economics for collecting a unit of heat can vary substantially with temperature. For example, it is relatively inexpensive to collect heat at ambient temperatures. However, high temperature heat from concentrated solar energy is technically feasible but much more expensive.

Heat pumps are an efficient means of producing high temperature heat from a temperature heat source and electrical energy. The conventional heat pump cycle includes the following steps: (a) extract heat from a low temperature heat reservoir by evaporating a working fluid, (b) compress the working fluid to increase the temperature, (c) condense the fluid back to liquid state by releasing the high temperature heat, and (d) lower the pressure to its initial value with an expansion valve.

While conventional heat pumps are effective for providing indoor heating, there are several challenges with using them for solar energy collection:
  a. Efficiency of combined heat pump—heat engine cycles is well below 100% which makes the economics difficult for energy storage
  b. Large temperature ranges typically require large pressure ratios which require expensive multi-stage compression
  c. Heat collection and heat rejection are constant temperature processes in traditional heat pumps but heat sources and storage devices are often better suited to heat absorption and emission over a wide temperature range Several configurations of heat pumps for energy storage have been described in the prior art. The solar assisted heat pump was developed in the 1970s and recently revised per Aktas, et al, "Designing a novel solar-assisted heat pump system with modification of a thermal energy storage unit," Proceedings of the Institution of Mechanical Engineers Part A Journal of Power and Energy, May, 2019. It consists of either parallel operation of a solar-thermal collector and a heat pump or series operation of a solar collector and a heat pump. In both cases, there was no attempt to extract heat from non-overlapping temperature ranges.

In patent publication EP 2241737B1, Hemrle et al. describe a thermal storage system that pumps heat from a single lower temperature reservoir to a thermal storage liquid transferred between two storage tanks.

In U.S. Ser. No. 10/288,357, Laughlin et al. describe an energy storage and retrieval system that pumps heat between a cold-side thermal reservoir and a hot-side thermal reservoir and uses a combination of the hot side thermal reservoir and an external heat source during the discharge cycle.

In view of the foregoing, an object of the invention is to provide improved heat pumps and methods of operation thereof.

A further object of the invention is to provide such heat pumps and methods as can be effectively used to collect energy from multiple energy sources of varying temperature.

A still further object of the invention is to provide such heat pumps and methods as can be effectively used to collect energy from solar and other high-temperature energy sources.

SUMMARY OF THE INVENTION

The foregoing are among the objects attained by the invention, which provides in some aspects a heat pump that includes a first heat extraction unit providing thermal coupling between a working fluid and a first heat source to extract heat therefrom in a first temperature range, a second heat extraction unit providing thermal coupling between the working fluid and a second heat source to extract heat therefrom in a second temperature range, and a thermal store. The second temperature range is, on average, higher than the first temperature range. A via that is coupled to the first heat extraction unit, the second heat extraction unit, and the thermal store defines a fluid circuit through which the working fluid flows. That flow, which goes serially from the first heat extraction unit to the second heat extraction unit to the thermal storage unit, may go directly from each such unit to the next directly or indirectly (e.g., by way of one or more intermediate units). A pressure reduction stage is coupled to the via and serially disposed on the fluid circuit between the thermal store and the first heat extraction unit. In addition, either a compressor or a recuperator (or both) are coupled to the via and disposed on the fluid circuit between the first heat extraction unit and the second heat extraction unit.

Related aspects of the invention provide a heat pump, e.g., as described above, wherein the first and second temperature ranges are distinct, i.e., non-overlapping.

Other related aspects of the invention provide a heat pump, e.g., as described above, that includes both the aforesaid recuperator and the aforesaid compressor, and wherein the recuperator is disposed on the fluid circuit to extract heat from working fluid exiting the thermal store and to transfer that heat to working fluid exiting the first heat extraction unit.

Yet still other related aspects of the invention provide a heat pump, e.g., as described above, wherein the first compressor is disposed on the fluid circuit downstream of the second heat extraction unit. According to another related aspect of the invention, the first compressor is disposed on the fluid circuit upstream of the second heat extraction unit.

Still other related aspects of the invention provide a heat pump, e.g., as described above, wherein the working fluid is C6K perfluoroketone, propane, butane, isobutane, butene, pentane, isopentane, neopentane, D4, D5, D6, MDM, MD2M, MD3M, MD4M, or other hydrocarbon, perfluorocarbon, perfluoroketone, hydrofluorocarbon, hydrofluoroolefin, or siloxane.

Other related aspects of the invention provide a heat pump, e.g., as described above, wherein the recuperator is a finned-tube heat exchanger operating with counter-current flows.

Still other related aspects of the invention provide a heat pump, e.g., as described above, wherein the thermal coupling between the first heat source and the working fluid in the first heat extraction unit causes the working fluid to evaporate and/or provides to that fluid an energy of evaporation.

Other related aspects of the invention provide a heat pump, e.g., as described above, comprising one or more additional heat extraction units that are coupled to the via and through which the working fluid flows between the second heat extraction unit and the thermal store.

Yet other related aspects of the invention provide a heat pump, e.g., as described above, that is operable in a charging cycle to deposit thermal energy in the thermal store and operable in a discharge cycle to remove thermal energy from the thermal store.

Still yet other related aspects of the invention provide a heat pump, e.g., as described above, wherein the first heat extraction unit comprises a heat exchanger that transfers to the working fluid heat from a low temperature heat source.

Other related aspects of the invention provide a heat pump, e.g., as described above, where the low temperature heat source provides sufficient thermal energy to evaporate the working fluid.

Yet other related aspects of the invention provide a heat pump, e.g., as described above, wherein the low temperature heat source is any of waste heat from an industrial process, thermal energy from the environment and hot water collected from solar thermal energy.

Other related aspects of the invention provide a heat pump, e.g., as described above, wherein the working fluid is any of C6K perfluoroketone, propane, butane, isobutane, butene, pentane, isopentane, neopentane, D4, D5, D6, MDM, MD2M, MD3M, MD4M, or other hydrocarbon, perfluorocarbon, perfluoroketone, hydrofluorocarbon, hydrofluoroolefin, or siloxane.

Yet other related aspects of the invention provide a heat pump, e.g., as described above, wherein the second heat extraction unit provides for any of direct and indirect heating of the working fluid by the second heat source.

Still related aspects of the invention provide a heat pump, e.g., as described above, wherein the second heat extraction unit comprises a heat exchanger that transfers to the working fluid heat from the second heat source.

Other related aspects of the invention provide a heat pump, e.g., as described above, wherein the second heat source is a high temperature solar thermal collector.

Still other related aspects of the invention provide a heat pump, e.g., as described above, wherein the thermal store comprises sand.

Yet still other related aspects of the invention provide a heat pump, e.g., as described above, operating in a charging cycle wherein the working fluid (i) changes phase from liquid to gas as it absorbs heat from the first heat source in the first heat extraction unit, (ii) increases in temperature in any of the first compressor and the recuperator, (iii) absorbs additional heat from the second heat source in the second heat extraction unit, (iv) delivers heat to the thermal heat source, and (v) is subjected to a pressure drop in the pressure reduction stage, prior to re-entry to the first heat extraction unit.

Other related aspects of the invention provide a heat pump, e.g., as described above, operating in a discharge cycle wherein the working fluid exchanges heat with a thermal sink.

Still other related aspects of the invention provide a heat pump, e.g., as described above, wherein the thermal sink is any of a heat engine and a heat extraction unit.

Yet other related aspects of the invention provide a heat pump, e.g., as described above, comprising a second compressor coupled to the via and disposed on the fluid circuit between the second heat extraction unit and the thermal store.

Still yet other related aspects of the invention provide a heat pump, e.g., as described above, comprising the recuperator and the first and second compressors, wherein the recuperator is disposed on the fluid circuit to extract heat from working fluid exiting the thermal store during a charging cycle and to transfer that heat to working fluid exiting the first heat extraction unit.

Yet still other related aspects of the invention provide a heat pump, e.g., as described above, wherein the first compressor is disposed on the fluid circuit downstream of the recuperator, and the second compressor is disposed on the fluid circuit downstream of the second heat extraction unit.

Yet other related aspects of the invention provide a heat pump, e.g., as described above, wherein the working fluid is any of C6K perfluoroketone, propane, butane, isobutane, butene, pentane, isopentane, neopentane, D4, D5, D6, MDM, MD2M, MD3M, MD4M, or other hydrocarbon, perfluorocarbon, perfluoroketone, hydrofluorocarbon, hydrofluoroolefin, or siloxane.

The foregoing and other aspects of the invention are evident in the text that follow and in the drawings.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
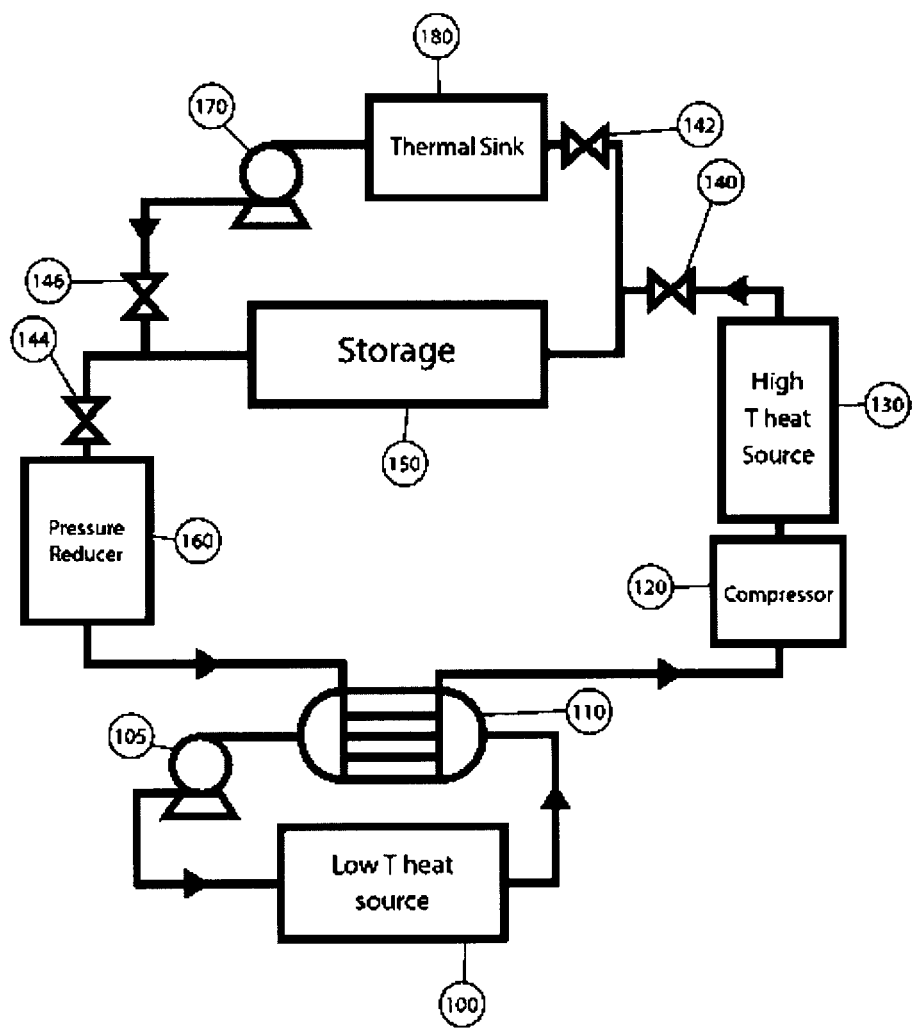
FIG. 1 is a schematic diagram of a dual heat source heat pump using a compressor to boost the temperature between the heat sources.

Described below and illustrated in the drawings are heat pumps and methods of their operation according to the invention that extract heat from multiple external heat sources, e.g., at distinct, non-overlapping temperature ranges, into a single working fluid circuit that delivers the pumped heat and energy to a thermal energy storage reservoir. These heat pumps operate in two modes—charging and discharging. During charging, thermal energy is deposited in a thermal energy storage unit. During discharging, the thermal energy is extracted.

Heat pumps according to the invention provide an economically viable way to collect heat from different sources, e.g., low temperature sources (such as, for example, ambient air), and heat from high temperature sources (such as, for example, a solar collector), into a single stream of thermal energy that can be easily stored for later use, e.g., in electrical generation or process heating.

Heat from the low temperature source(s) is used in some embodiments to provide the energy of evaporation to the working fluid, while that from the high energy sources is used to further heat that fluid to improve the overall electrical efficiency of the heat generators. In some embodiments, heat pumps according to the invention can collect additional energy from heat sources at still higher temperatures to further improve the overall efficiency. The combination of multiple heat sources enables the exploitation of sources that can be optimized for economic efficiency of the generated electricity.

Some embodiments of the invention extend the heat pump circuit configuration with compression and/or recuperation stages between heat sources to boost the temperature of the working fluid between heat collection stages. Having collected heat, the working fluid discharges its thermal energy to a thermal store before traversing a pressure reduction stage and re-entering the evaporation stage.

Referring to the drawings, there are shown embodiments of the invention in which a working fluid flows through a fluid circuit that is defined by a via carrying the fluid from component to component and that (a) extracts heat from multiple heat sources, (b) boosts the temperature of the collected heat, (c) delivers the heat to a thermal storage unit and (d) retrieves the thermal energy from storage unit at a later time. The description that follows depicts the flow paths defined by the via in the fluid circuit for the working fluid as it absorbs heat at one temperature (or temperature range) corresponding to a boiling point for the fluid and at a second, higher temperature (or temperature range) that are different from—and, more typically, substantially different from—that first temperature. The fluid in the circuit then deposits the absorbed heat into an energy storage device. It will be understood that additional components may be included in the flow path of the working fluid and that these represent different embodiments of the inventions detailed in these examples.

Components of the heat pumps shown in FIGS. 1-5 and discussed below, are coupled by piping, tubing or other structures of the type known in the art suitable for defining a fluid path (or circuit) and carrying the working fluid along that path as illustrated in the drawings and described below. That path and those structures are depicted by solid lines (typically, with directional arrows) in the drawing, as per convention.

The via, which can run around or through the illustrated components (and, indeed, may be integral to one or more of them), is thermally conductive, at least along portions of the circuit, so as to provide thermal coupling between the working fluid and selected respective components (such as the heat extraction units and/or their respective heat sources, the thermal store, the recuperators, and so forth) as it flows through or around them. The via is fluidly coupled to—though, thermally insulated from—other components (such as compressors, pumps, valves and so forth) along the circuit so as to permit the working fluid to be compressed/pressurized, expanded/depressurized, routed and otherwise fluidomechanically manipulated by those other components without unnecessary heat loss. The fabrication and use of the via in these regards is within the ken of those skilled in the art in view of the teachings hereof.

FIG. 1 is a schematic depicting the fluid circuit of a heat pump according to one embodiment of the invention. A low temperature heat source 100 provides thermal energy to initiate the cycle. Potential heat sources include waste heat from industrial processes, thermal energy collected from ambient air temperature and hot water collected from solar thermal energy, all by way of non-limiting example. The heat source is placed into thermal coupling with a first heat exchanger 110 in the conventional manner known the art as adapted in according with the teachings hereof.

The energy from the low temperature heat source is exchanged with a working fluid in the heat exchanger 110. In the illustrated embodiment, the working fluid is isobutane which has a low boiling point and thus can be evaporated at a low temperature (e.g., 40 C) and a pressure exceeding atmospheric pressure. In the illustrated embodiment, the heat exchanger substantially and, preferably, completely evaporates the working fluid and may provide additional heat to raise the temperature of the now gaseous working fluid even further. Other working fluids, including low molecular weight hydrocarbons like n-butane, propane, isobutene and refrigerant gases like HFC-227, are also possible. In the illustrated embodiment, the heat exchanger is of a shell and tube design, though, other designs within the ken of those skilled in the art may be used instead or in addition. Some other possible heat exchanger varieties include plate and frame and spiral tube heat exchangers, to name a few. The heat exchanger connects (i.e., as used here and elsewhere herein in like context, "is fluidly coupled") to a compressor 120 by way of the via per convention in the art as adapted in accord with the teachings hereof.

In the compressor, 120, the pressure of the working fluid is increased. The compressor can be of any type known in the state of the art including centrifugal, axial, screw, scroll and piston, by way of non-limiting example. In normal application, all of these technologies compress under nearly adiabatic conditions for which the following relation holds:

$$P^{1-\gamma}T^{\gamma}=\text{Constant}$$

where γ is the adiabatic exponent of the working fluid, P is the pressure and T is the temperature. The adiabatic exponent for working fluids of practical interest is greater than 1 in the gas phase. As a result of the above relation, pressure increases also require temperature increases. Having increased the temperature the compressor conveys the working fluid to the high temperature heat source 130. As used here and elsewhere herein in like context, to "convey" means to route the working fluid by way of the via per convention in the art as adapted in accord with the teachings hereof.

The high temperature heat source communicates (i.e., as used here and elsewhere herein in like context, "is in thermal coupling") with the working fluid either directly or through a second heat exchanger (not shown in FIG. 1) of the type known in the art to increase the temperature of the working fluid. Such communication (or coupling) as referred to here and elsewhere herein in analogous context may be effected per convention in the art as adapted in accord with the teachings hereof. In the illustrated embodiment, the high temperature heat source is a high temperature solar thermal collector. The fluid exits the high temperature heat source (or collector) and connects to control valve 140 via piping or other structures making up the respective portion of the via.

The control valve 140 connects the high temperature heat source to the thermal storage unit 150 and to the control valve 142. Such connection (or fluid couplings) as referred to here and elsewhere herein in analogous context may be effected per convention in the art as adapted in accord with the teachings hereof. During the charging operation, the valve 140 is open and conducts the working fluid into the thermal storage unit while valve 142 remains closed.

In the illustrated embodiment, the thermal storage unit 150 is a container of sand with pipes that convey the working fluid through the sand. As the fluid passes through the fluid pipes in the sand, it transmits heat to the sand and its temperature decreases. The thermal storage unit is of sufficient length to enable the majority of heat collected from the thermal reservoirs to discharge into the sand before the working fluid exits the thermal storage unit. In other embodiments, the storage reservoir could consist of a packed bed storage system where the working fluid percolates through porous material. In yet another embodiment, the thermal storage unit could consist of a thermal storage fluid that is heated by the action of the working fluid in a heat exchanger. Still other constructions of the thermal storage unit 150 are within the ken of those skilled in the art in view of the teachings hereof. The thermal storage unit thus constructed connects to the control valves 140, 142, 144 and 146. During the thermal charging operation, the control valve 144 conducts the working fluid to the pressure reduction device 160 while the control valve 146 remains closed.

The pressure reducer device 160 connects the control valve 144 to the heat exchanger 100. In the illustrated embodiment, the pressure reducer is an energy recovery turbine but it could also be an expansion valve or other device of the type known in the art having like fluidomechanical effect on the working fluid. By virtue of the cooling of the working fluid in the storage unit 150, the working fluid will re-enter the heat exchanger 110 at least partly in the liquid state where it will be evaporated to complete the cycle.

Figure 6:
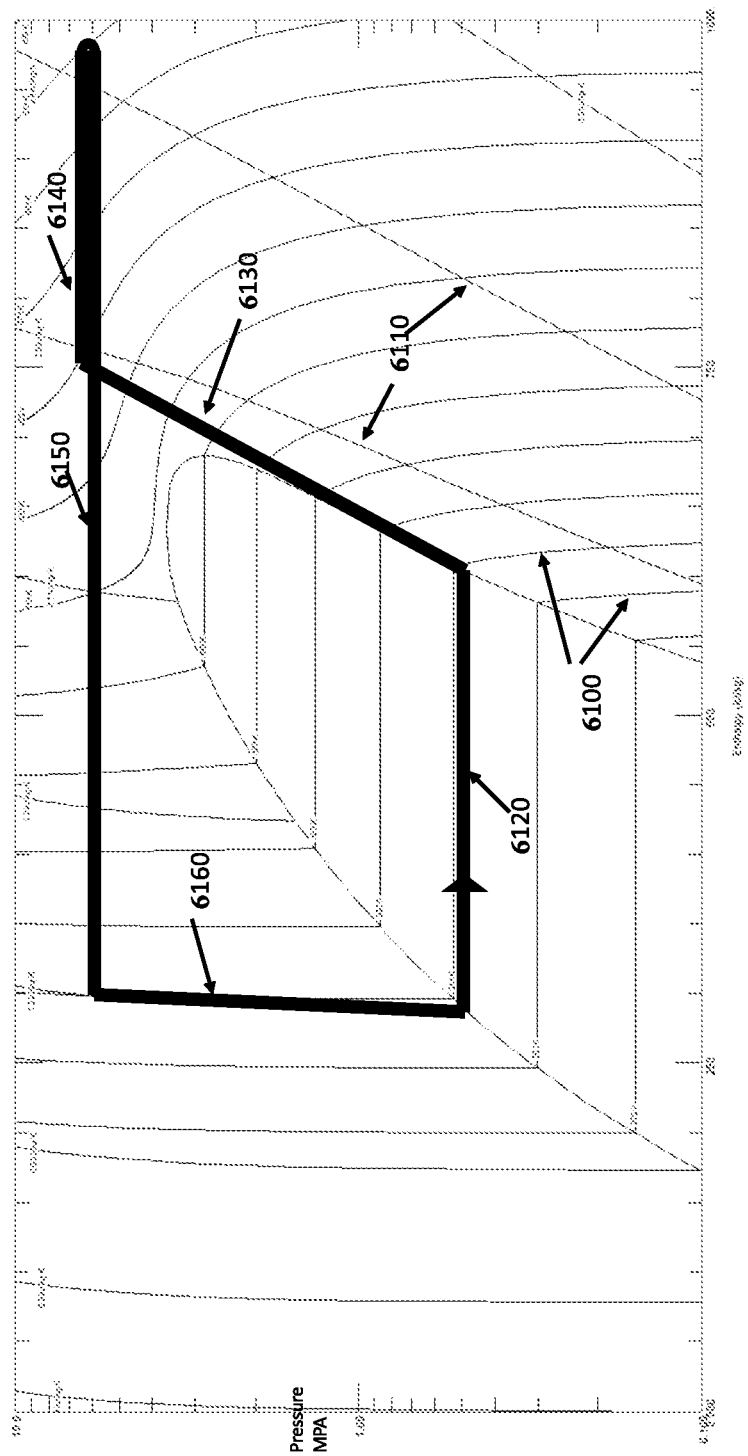
FIG. 6 is a representative pressure-enthalpy diagram of a working fluid undergoing the heating-compression-heat cycle described in connection with FIG. 1.

FIG. 6 depicts the charging cycle from the point of view of the working fluid that traverses the circuit in FIG. 1. The x-axis of FIG. 6 is the enthalpy of the working fluid. The y-axis is the pressure. Lines of constant temperature 6100 and enthalpy 6110 are also shown. The initial evaporation of the working fluid is shown as item 6120. The working fluid absorbs heat at constant temperature of 313K from the low temperature heat source as it changes phase from liquid to gas. After evaporation, the working fluid is compressed 6130. In this example cycle, the working fluid temperature increases in temperature from 313K to 453K due to compression. Note that the compression is nearly isentropic (i.e., parallel to the lines of constant entropy 6110) but that inefficiencies in the compression phase will introduce additional energy in the form of heat thereby increasing the enthalpy of the working fluid slightly above that expected from an isentropic compression. The working fluid then absorbs additional heat as indicated by 6140. This heat is delivered by the high temperature heat source and it provides heat from 453K to 513K in this example. Having completed the heating cycle, the heat is then transferred to the storage system along the trajectory 6150. As shown in the diagram, the temperature drops from 513K back to the starting temperature of 313K for a total heat transfer of 200K. Finally, step 6160 illustrates the nearly isentropic pressure reduction in the pressure reduction device resulting in the completion of the thermodynamic cycle.

Once the thermal storage system is charged, the valves 140 and 144 in FIG. 1 are closed. Valves 142 and 146 are opened to connect the thermal store 150 to the pump 170 and thermal sink 180.

Operation of the pumps, valves and other active components of a heat pump according to the invention (e.g., as illustrated in FIGS. 1-5), as described above and elsewhere herein, during a charging cycle may be effected "by hand" by an operator (not illustrated), by machine, e.g., by a digital data processor, PLC or other control devices or combination thereof (not illustrated), or by a combination of man and machine, all as per convention in the art as adapted in accord with the teachings hereof.

The fluid pump 170 connects to the thermal sink 180 and the valve 146. When discharging the thermal energy, the pump transmits the working fluid through the valve 146. The valve 146 connects the fluid pump to the thermal storage unit 150 and to valve 144. When discharging, the valve 146 remains open and transmits the working fluid to the thermal storage unit 150. In the storage unit 150, the flow direction of the working fluid is reversed compared to charging. The working fluid enters at a low temperature and exits the storage unit at a high temperature. The storage unit connects to valves 140 and 142. During discharging, valve 142 remains open and valve 140 remains closed. Valve 142 connects to the thermal sink 180. After exiting valve 142, the fluid enters the thermal sink 180. The thermal energy gained from the thermal storage unit is consumed by the thermal sink. In the illustrated embodiment, the thermal sink is a heat engine using a turbine in a Rankine cycle as is customary in the state of the art. In other embodiments, a heat exchanger can be used to extract the heat from the working fluid. The thermal sink is connected to pump 170. When the working fluid re-enters the pump, the cycle continues.

As noted above with respect to the charging cycle, operation of the pumps, valves and other active components of a heat pump according to the invention (e.g., as illustrated in FIGS. 1-5), as described above and elsewhere herein, during a discharging cycle may be effected "by hand" by an operator (not illustrated), by a machine, e.g., by a digital data processor, PLC or other control devices or combination thereof (not illustrated), or by a combination of man and machine, all as per convention in the art as adapted in accord with the teachings hereof.

Figure 2:
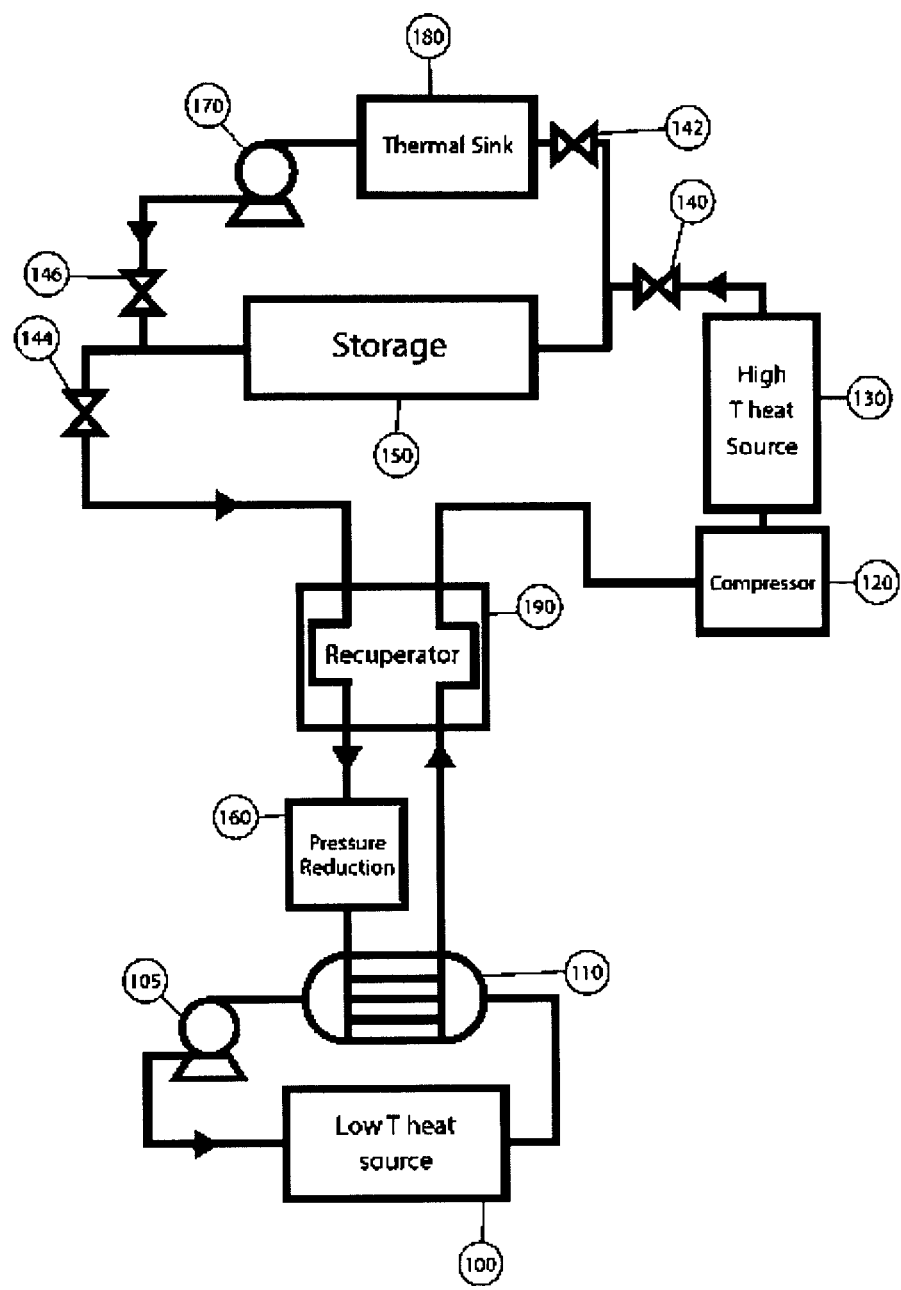
FIG. 2 is a schematic diagram of a dual heat source heat pump using a recuperator and a compressor to boost the temperature between the heat sources.

FIG. 2 depicts an embodiment of the invention wherein the temperature difference between the two heat sources is maintained through the combined action of a recuperator and a compressor. In the illustrated embodiment of this configuration, the working fluid is Novec 649 heat transfer fluid manufactured by 3M corporation but also known as C6K perfluoroketone. In other embodiments, different working fluids such as, by way of nonlimiting example, low molecular weight hydrocarbons, silxonaes, and hydrofluorocarbons could be used.

The operation of the system in FIG. 2 proceeds in a similar fashion to that described in FIG. 1. The low temperature heat source 100, the pump 105, the high temperature heat source 130, the valves 140, 142, 144, 146, the thermal storage unit 150, the pressure reducer 160, the pump 170, and the thermal sink 180 perform the same functions as described above and are connected in the same way.

The newly illustrated element in this configuration is the recuperator 190. It is positioned to intercept two flow paths: the first flow path is from the valve 144 to the pressure reducer 160, the second flow path is from the heat exchanger 110 to the compressor 120. The function of the recuperator is to transfer heat from the first flow path to the second flow path. In the illustrated embodiment, the recuperator is a finned-tube heat exchanger operating with counter-current flows, though in other embodiments other devices of the type known in the art having like fluidomechanical effect on the working fluid may be used instead or in addition. The working fluid from valve 144 is conveyed through the tubes of the recuperator in a counter-current flow pattern so that the temperature of the working fluid transmitted to the pressure reducer 160 is at a substantially lower temperature. The working fluid from the heat exchanger 110 passes over the tube fins in the recuperator 190. The heat raises the temperature of the working fluid as it is conveyed to the compressor 120.

The heat exchanger 110 connects to the pump 105 and low temperature heat source 100 on one side. The other side of the heat exchanger connects to the pressure reducer 160 and the recuperator 190. It conveys heat from the low temperature heat source to evaporate the working fluid.

The compressor 120, connects the recuperator 190 and the high temperature heat source. As in the configuration described above, the compressor of the illustrated embodiment is a centrifugal machine but other suitable compression technologies within the ken of those skilled in the art could be used instead or in addition.

The valve 144 connects the storage unit 150 to the recuperator 190. During charging, the valve 144 conducts the working fluid from the storage unit to recuperator.

The pressure reducer 160 connects the recuperator 190 to the heat exchanger 110. In the illustrated embodiment, the pressure reducer is a turbine. As described above, other technologies are possible.

The return of the working fluid to the heat exchanger 110 completes the thermal charging cycle. The heat absorbed in the storage system can be retrieved using the same mechanism as in FIG. 1—namely reconfiguring the valves 140, 142, 144, 146 to enable the pump 170 to circulate working fluid through the storage 150 and into the thermal sink 180.

Figure 7:
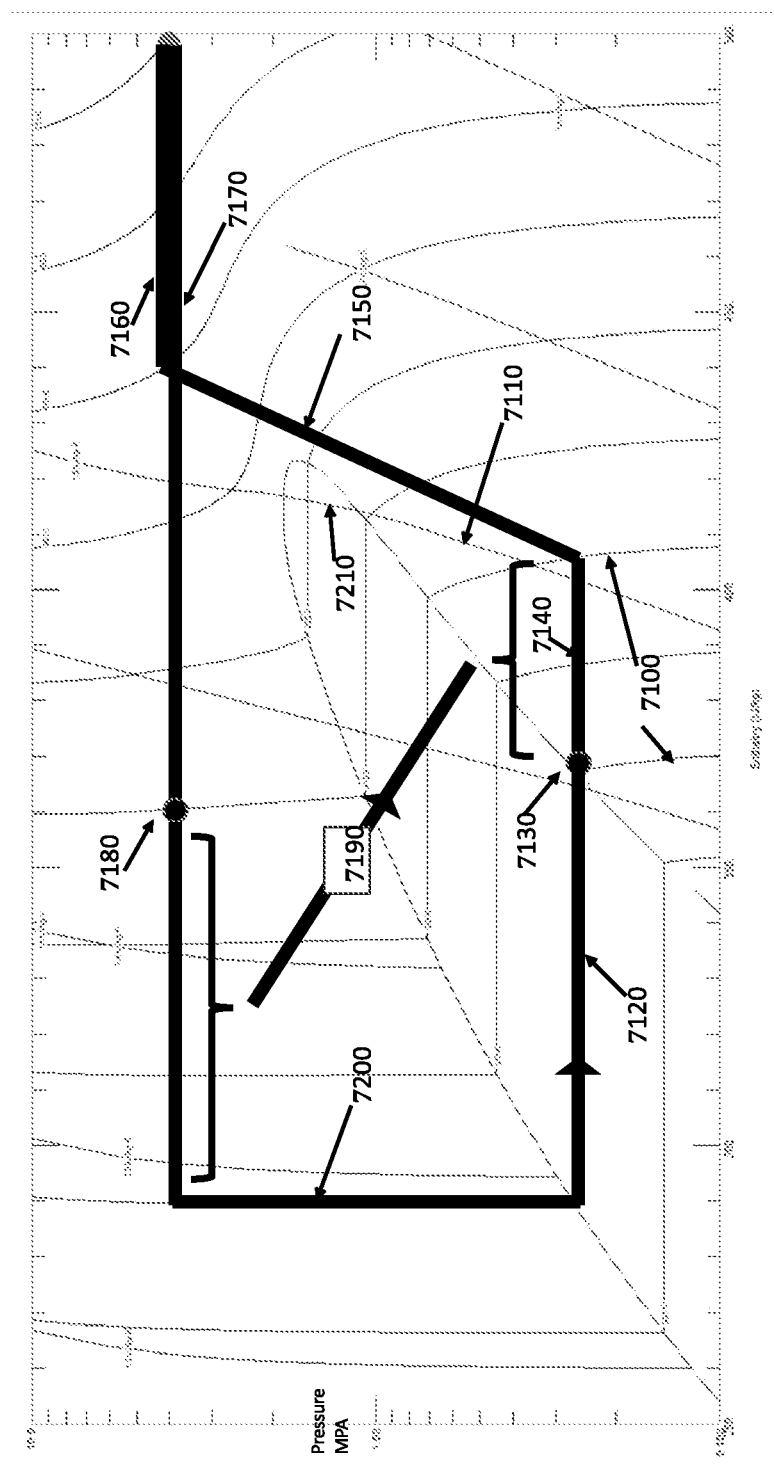
FIG. 7 is a representative pressure-enthalpy diagram of a working fluid undergoing the heating-recuperation-compression-heat cycle described in connection with FIG. 2.

FIG. 7 depicts the charging cycle of the embodiment of FIG. 2 from the point of view of the working fluid. As in FIG. 6, this is a plot of pressure vs enthalpy for a representative working fluid with lines of constant temperature 7100 and constant entropy 7110. Note that unlike FIG. 6, the line of constant entropy 7110 that begins at low pressure passes through the phase boundary of the working fluid 7210. This poses a problem for many types of compressor technology and specifically for centrifugal and axial turbines because the mixed phase material will impinge on the rotor blades and quickly erode them. It is this characteristic of the working fluid that requires the recuperator 7140 in the cycle. The recuperator preheats the working fluid from 353K to 393K before the compression phase 7150 and thereby prevents the nearly isentropic compression from traversing the phase boundary. As in FIG. 6, the working fluid absorbs additional heat from a high temperature source 7160 over the range of 473K to 513K and then passes through the storage unit 7170 to release the heat from 513K to 413K. Item 7180 in FIG. 7 identifies the point of exit from the thermal storage and then entry into the recuperator. The recuperator transfers heat from the high pressure fluid to the low pressure fluid 7190. On exiting the recuperator, the high pressure fluid enters the pressure reducer 7200 and returns to a low temperature and low pressure state where it can absorb heat during evaporation 7120 from the low temperature heat source. The gas phase of the working fluid then enters the recuperator again at 7130 to complete the cycle.

Figure 3:
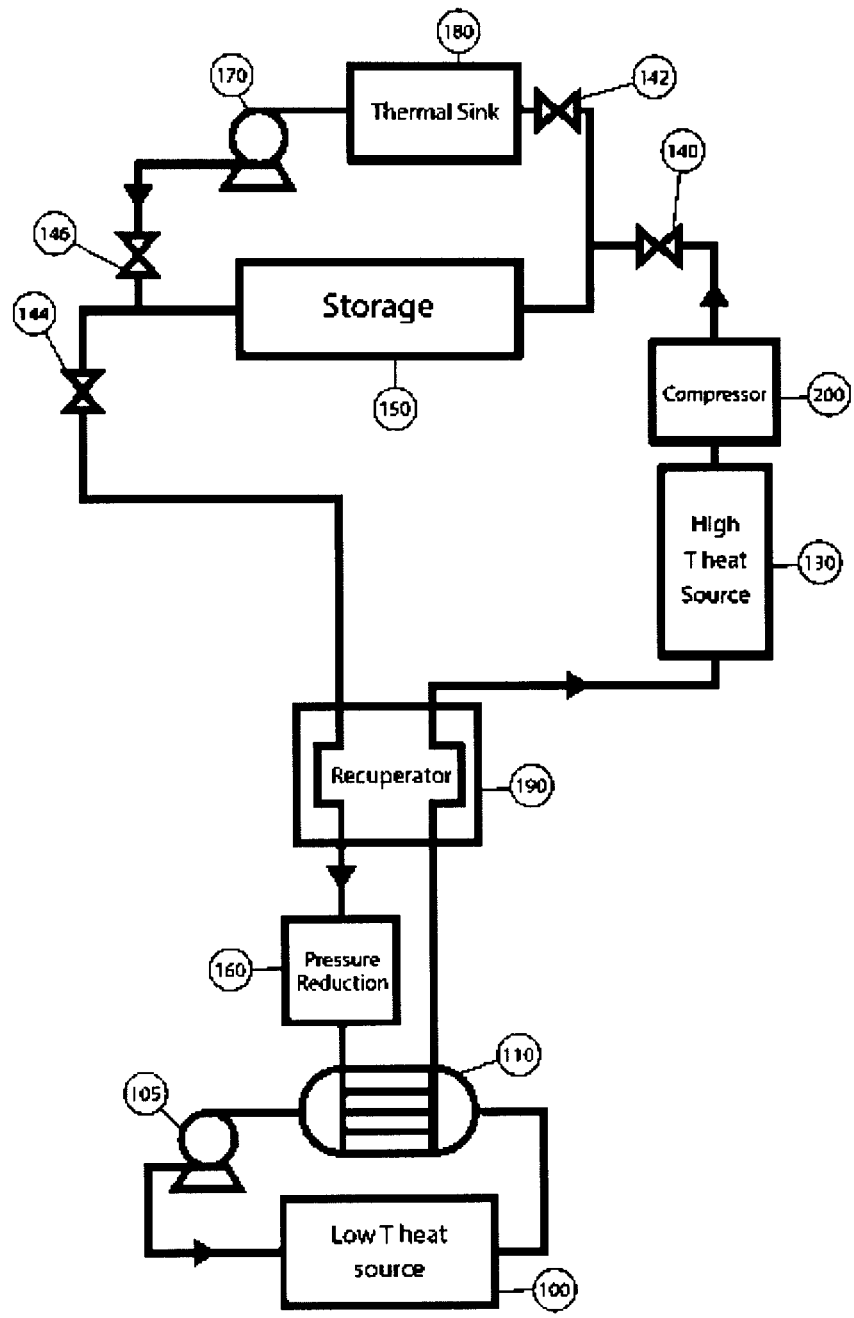
FIG. 3 is a schematic diagram showing a dual heat source with a recuperator providing the temperature boost between the heat sources.

FIG. 3 depicts an embodiment of the invention wherein the temperature difference between the two heat sources is maintained through the action of a recuperator and additional temperature lift is provided by a compressor positioned after the high temperature heat source. In the illustrated embodiment of this configuration, the working fluid is Novec 649 heat transfer fluid manufactured by 3M corporation but also known as C6K perfluoroketone. In other embodiments, different working fluids such as, by way of non-limiting example, low molecular weight hydrocarbons, silxonaes, and hydrofluorocarbons could be used.

The operation of the system in FIG. 3 proceeds in a similar fashion to that described in FIG. 2. The low temperature heat source 100, the pump 105, the heat exchanger 110, the valves 142, 144, 146, the storage 150, the pressure reducer 160, the pump 170, and the thermal sink 180 perform the same functions as described above and are connected in precisely the same way.

The configuration of FIG. 3 differs from FIG. 2 in that the compressor 120 from FIG. 2 has been removed and a new compressor 200 has been added in FIG. 3 between the high temperature heat source 130 and the valve 140.

The recuperator 120 connects to the valve 144 and the pressure reducer 160 for the first flow path. It's second flow path connects to the heat exchanger 110 and to the high temperature heat source 130. As in FIG. 2, the recuperator transfers heat from the first flow path to the second flow path.

The high temperature heat source connects to the recuperator 120 and the compressor 200. The heated fluid exiting from the recuperator receives additional heat from the high temperature heat source either directly or indirectly through a heat exchanger. This increases the temperature of the working fluid as it exits the high temperature heat source and enters the compressor 200.

The compressor 200 connects to the high temperature heat source 130 and the valve 140. As with the compressor 120 in FIG. 1 described above, the action of the compressor on the working fluid will increase the pressure and temperature of the working fluid.

The valve 140 connects to the compressor 200, the thermal storage unit 150 and the valve 142. During the charging operation, the valve 140 remains open and allows the working fluid to circulate through the thermal storage unit. On exiting from the valve 140, the fluid circulates through the same components as in FIG. 2 in the same sequence during charging.

During discharging the fluid flow is the same as described in FIG. 2. The fluid flows through valve 142, thermal storage unit 150, valve 144, pump 170, and thermal sink 180 before returning to valve 142. Valves 140 and 144 remain closed during discharging.

Figure 8:
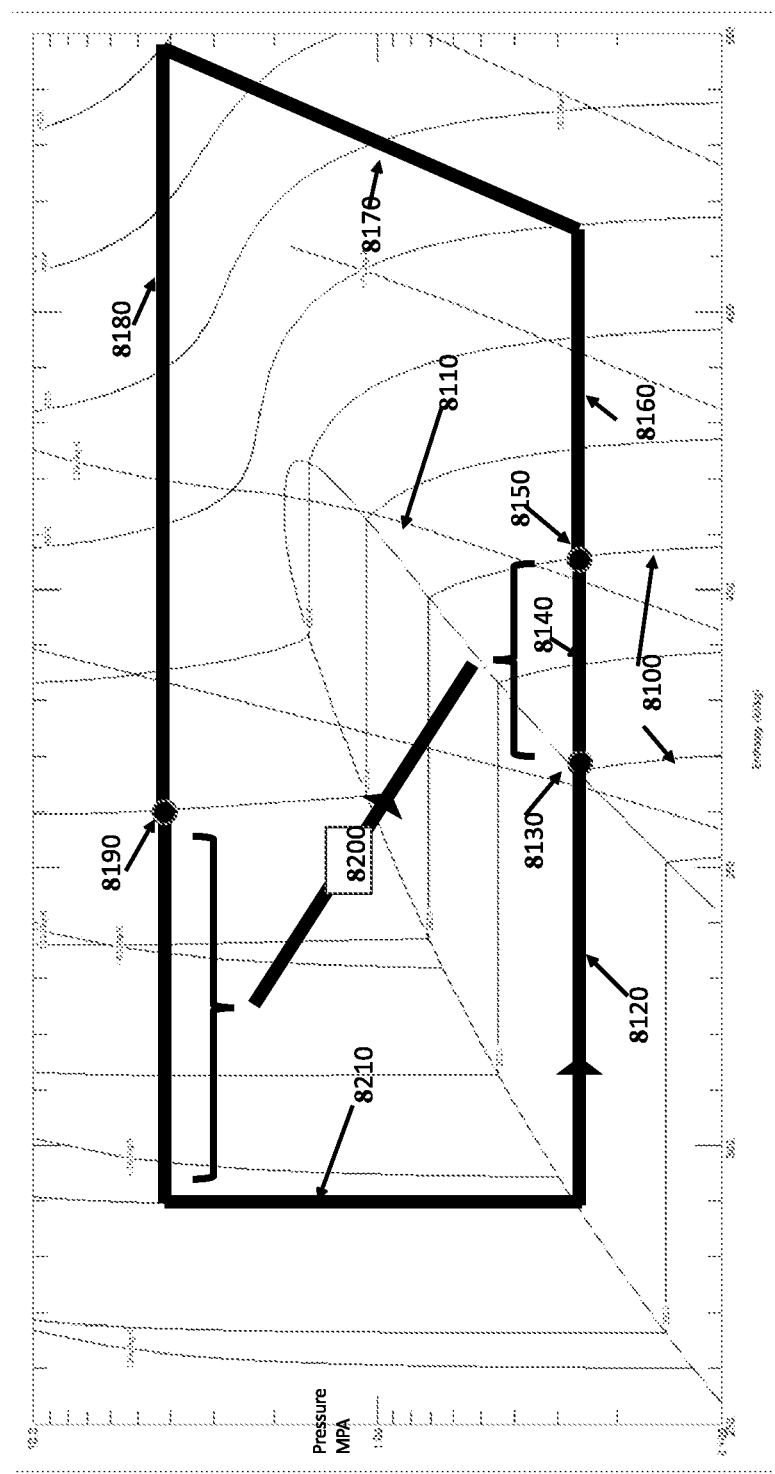
FIG. 8 is a representative pressure-enthalpy diagram of a working fluid undergoing the heating-recuperation-heating-compression cycle described in connection with FIG. 3.

FIG. 8 depicts the charging cycle in FIG. 3 from the point of view of the working fluid. Again, this is a pressure-enthalpy diagram with lines of constant temperature 8100 and constant entropy 8110. The evaporation of the working fluid occurs at step 8120 at a temperature of 353K. Item 8130 indicates the entry into the recuperator which heats the fluid from 353K to 393K as indicated at 8140. The fluid then exits the recuperator at point 8150 and passes through the high temperature heat source 8160 to increase in temperature to 453K. The compression phase 8170 increases the temperature to 513K. The fluid then enters the storage unit 8180 where it releases heat as it cools from 513K to 413K. At 8190, the fluid re-enters the recuperator and transmits heat to the low pressure phase of the cycle 8200. Once the fluid has cooled, it enters the pressure recovery device 8210 which returns it to the heat exchanger and completes the cycle.

Figure 4:
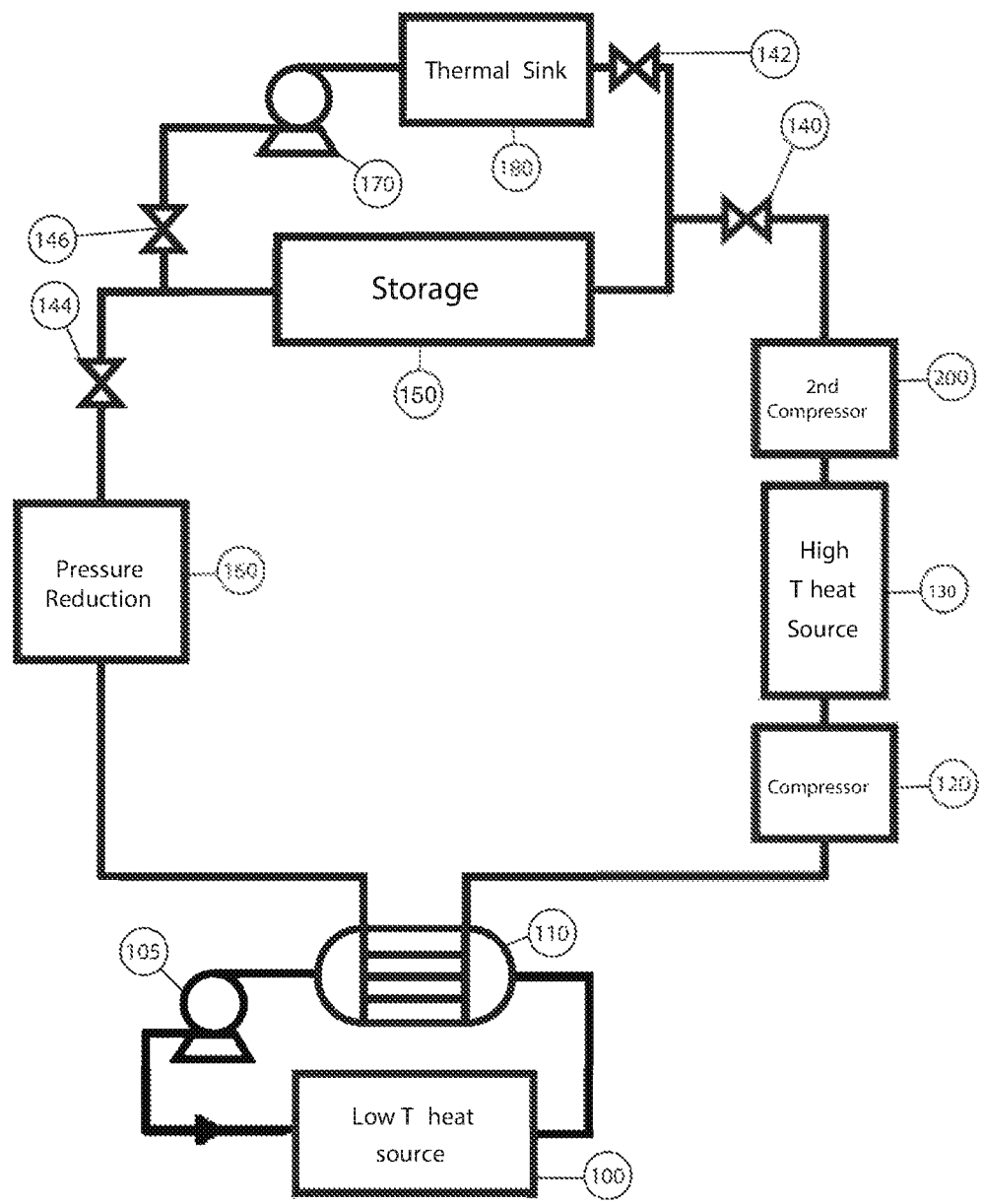
FIG. 4 is a schematic diagram showing a dual heat source with a compressor to boost the temperature between the heat sources and a second compressor to boost the temperature before storage.

FIG. 4 depicts an embodiment of the invention wherein the temperature difference between the two heat sources is maintained through the action of a compressor 120 as in FIG. 1, and an additional compressor 200 further increases the temperature and pressure of the working fluid before it enters the thermal storage unit. In the illustrated embodiment, the working fluid is isobutane. In other embodiments, different working fluids such as low molecular weight hydrocarbons, silxonaes, and hydrofluorocarbons could be used.

The low temperature heat source 100, the pump 105, the heat exchanger 110, the compressor 120, the valves 142, 144, 146, the storage unit 150, the pressure reducer 160, the pump 170 and the thermal sink 180 all perform the same functions and are connected in the same way as in FIG. 1.

In the configuration of FIG. 4, the high temperature heat source 130 connects to the compressor 120 and the compressor 200. As the fluid passes through the high temperature heat source from compressor 120 to compressor 200, the temperature increases with the addition of heat.

The compressor 200 connects to the high temperature heat source 130 and to the valve 140. As the working fluid is compressed by the compressor, the temperature and pressure both increase as described above for compressor 120 in FIG. 1.

The valve 140 connects to the compressor 200, to the thermal storage unit 150 and to the valve 142. Valve 140 remains open during charging operation.

The discharging operation proceeds the same way as described in FIG. 1. Valves 140 and 144 are closed while valves 142 and 146 are opened. The pump 180 circulates the working fluid through the thermal sink 180, to the valve 144, into the storage unit 150 and back through the valve 146 which returns it the fluid to the pump.

Figure 9:
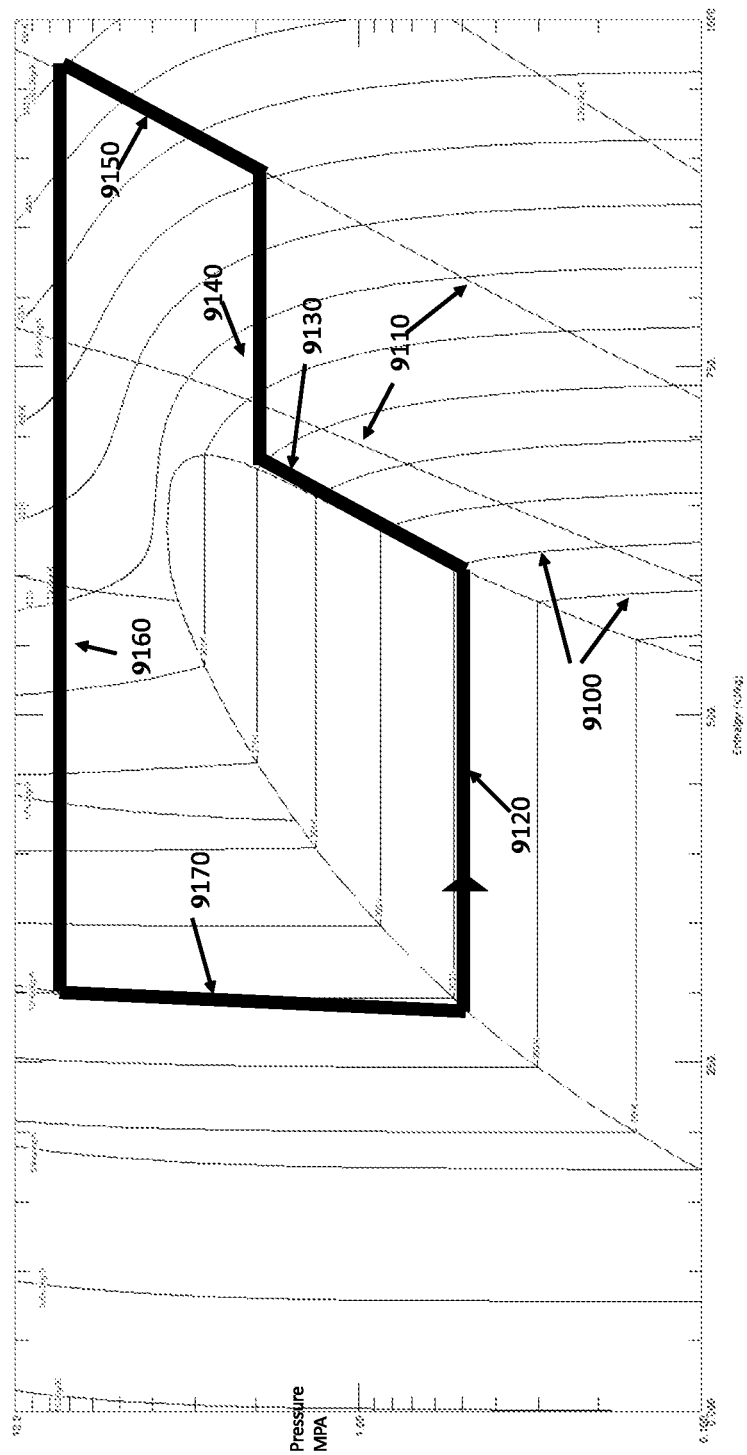
FIG. 9 is a representative pressure-enthalpy diagram of a working fluid undergoing the heating-compression-heating-compression cycle described in connection with FIG. 4.

FIG. 9. depicts the cycle in FIG. 4. from the point of view of the working fluid. As with the other examples, this is a pressure-enthalpy plot with lines of constant temperature 9100 and constant entropy 9110. The working fluid absorbs heat from the low temperature heat source at a temperature of 313K and turns to gas. The gas is compressed along segment 9130 to increase the temperature to 373K. The high temperature heat source supplies heat from 373K to 453K as indicated by segment 9140. The compressor further increases the temperature from 453K to 513K on the segment 9150. The heat is then delivered to the storage unit 9160 as its temperature falls from 513K to 313K. The fluid passes through the pressure reduction device 9170 to return to the evaporator and thus complete the cycle.

Figure 5:
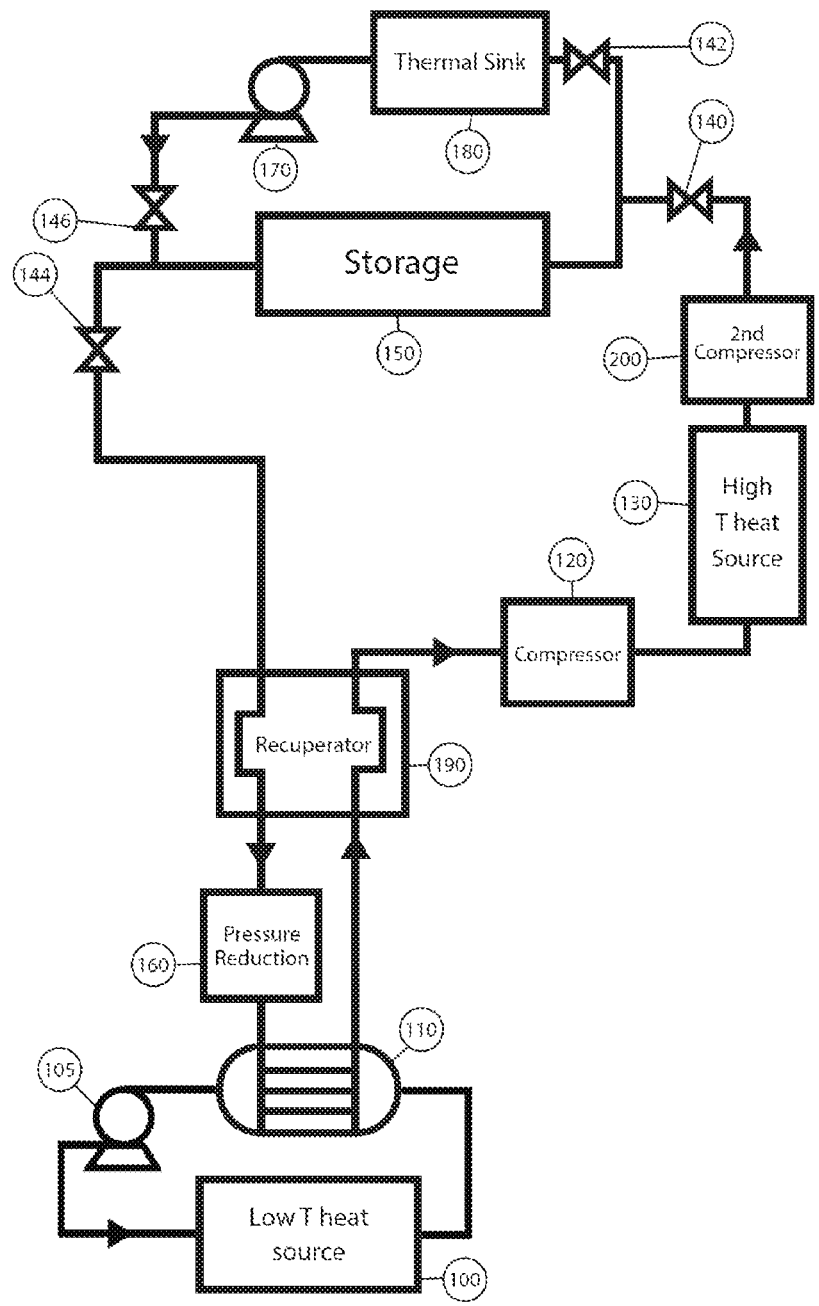
FIG. 5 is a schematic diagram showing a dual heat source where both a recuperator and a compressor boost the temperature between the heat sources and a second compressor boosts the temperature before storage.

FIG. 5 depicts an embodiment of the invention wherein the temperature difference between the two heat sources is maintained through the combined action of a recuperator and a compressor and a second compressor is used to boost the temperature of the working fluid before it deposits its thermal energy into the thermal storage unit. In the illustrated embodiment of this configuration, the working fluid is Novec 649 heat transfer fluid manufactured by 3M corporation but also known as C6K perfluoroketone. In other embodiments, different working fluids such as low molecular weight hydrocarbons, silxonaes, and hydrofluorocarbons could be used.

The operation of the system in FIG. 5 proceeds in a similar fashion to that described in FIG. 2. The low temperature heat source 100, the pump 105, the heat exchanger 110, the recuperator 190, the compressor 120, the valves 142, 144, 146, the thermal storage unit storage 150, the pressure reducer 160, the pump 170, and the thermal sink 180 all perform the same functions as described above for FIG. 2 and are connected in precisely the same way.

In the configuration of FIG. 5, the high temperature heat source 130 connects to the compressor 120 and the compressor 200. As the fluid passes through the high temperature heat source from compressor 120 to compressor 200, the temperature increases with the addition of heat.

The compressor 200 connects to the high temperature heat source 130 and to the valve 140. As the working fluid is compressed by the compressor, the temperature and pressure both increase as described above for compressor 120 in FIG. 1.

The valve 140 connects to the compressor 200, to the thermal storage unit 150 and to the valve 142. Valve 140 remains open during charging operation.

The discharging operation proceeds the same way as described in FIG. 1. Valves 140 and 144 are closed while valves 142 and 146 are opened. The pump 180 circulates the working fluid through the thermal sink 180, to the valve 144, into the storage unit 150 and back through the valve 146 which returns it the fluid to the pump.

Figure 10:
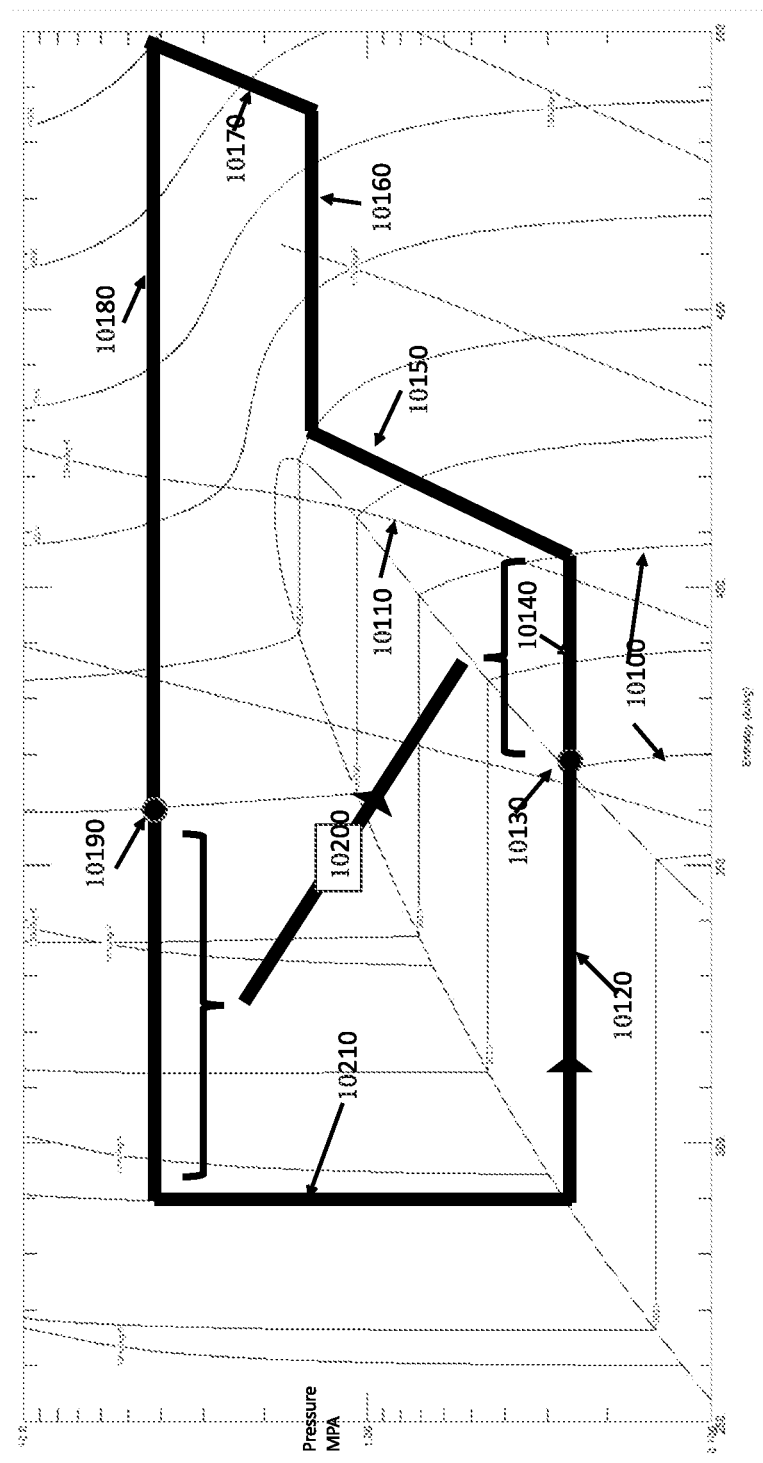
FIG. 10 is a representative pressure-enthalpy diagram of a working fluid undergoing the heating-recuperation-compression-heating-compression cycle described in connection with FIG. 5.

FIG. 10. depicts the cycle in FIG. 5. from the point of view of the working fluid. As with the other examples, this is a pressure-enthalpy plot with lines of constant temperature 10100 and constant entropy 10110. The working fluid absorbs heat from the low temperature heat source at a temperature of 353K and turns to gas. The gas enters the recuperator at 10130 and absorbs heat 10140 to increase the temperature to 393K. The compressor 10150 further increases the temperature from 393K to 433K. The fluid then passes to the high temperature heat source 10160 which supplies heat from 433K to 483K. The second compressor 10170 increases the temperature yet again to 513K. The heat in the working fluid is delivered to the storage system 10180 from 513K to 413K. It re-enters the recuperator at 10190 and transmits heat 10200 to the low pressure gas. After exiting the recuperator, the working fluid passes through the pressure reduction device 10210 and returns to the evaporator to complete the cycle.

Described above and illustrated in the drawings are heat pumps and methods of operation meeting the objects set forth previously. It will be appreciated that the illustrated embodiments are only examples of the invention and that other embodiments differing from those shown and described herein are encompassed by the invention, as well. Thus, for example, while preceding examples describe some selected components of heat pumps according to the invention, it will be understood by those practiced in the art that other components may be included in the fluid paths of these system instead or in addition to those shown in the drawings and discussed above, including, for example, pressure and temperature sensors, safety valves, piping and fittings, filters, oil separation devices and other instruments needed to support the operation of the particular choices of components in the system. It will be further understood by those practiced in the art that components such as 'compressor', 'recuperator', 'heat exchanger', 'pressure reducer', 'pump', 'thermal storage unit', and 'thermal sink' may all be implemented by alternative devices providing like functions.

Finally, it will be clear to those practiced in the art that while the configurations described in FIGS. 1-5 describe systems where there are only two independent temperature ranges supplied from external sources, it is possible to extend these description in the scope of the invention to include three or more heat sources by introducing additional heat exchangers and/or compressors in the flow path between those additional heat sources.

In view of the foregoing, what I claim is:

1. A heat pump, comprising:
   A. a first heat extraction unit providing thermal coupling between a working fluid and a first heat source to extract therefrom heat in a first temperature range,
   B. a second heat extraction unit providing thermal coupling between the working fluid and a second heat source to extract therefrom heat in a second temperature range that is, on average, higher than the first temperature range,
   C. a thermal store,
   D. a via that is coupled to the first heat extraction unit, the second heat extraction unit, and the thermal store, the via defining a fluid circuit through which the working fluid flows serially, any of directly and indirectly, from the first heat extraction unit to the second heat extraction unit to the thermal store,
   E. a pressure reduction stage coupled to the via and serially disposed on the fluid circuit between the thermal store and the first heat extraction unit,
   F. at least one of a first compressor and a recuperator coupled to the via and disposed on the fluid circuit between the first heat extraction unit and the second heat extraction unit.

2. The heat pump of claim 1, wherein the first and second temperature ranges are non-overlapping.

3. The heat pump of claim 1, comprising both the recuperator and the first compressor, wherein the recuperator is disposed on the fluid circuit to extract heat from working fluid exiting the thermal store and to transfer that heat to working fluid exiting the first heat extraction unit.

4. The heat pump of claim 3, wherein the first compressor is disposed on the fluid circuit downstream of the second heat extraction unit.

5. The heat pump of any of claims 3 and 4, wherein the working fluid is any of C6K perfluoroketone, propane, butane, isobutane, butene, pentane, isopentane, neopentane, D4, D5, D6, MDM, MD2M, MD3M, MD4M, or other hydrocarbon, perfluorocarbon, perfluoroketone, hydrofluorocarbon, hydrofluoroolefin, or siloxane.

6. The heat pump of claim 3, wherein the recuperator is a finned-tube heat exchanger operating with counter-current flows.

7. The heat pump of claim 1, wherein the thermal coupling in the first heat extraction unit provides to the working fluid an energy of evaporation.

8. The heat pump of claim 1, comprising one or more additional heat extraction units that are coupled to the via and through which the working fluid flows between the second heat extraction unit and the thermal store.

9. The heat pump of claim 1 operable in a charging cycle to deposit thermal energy in the thermal store and operable in a discharge cycle to remove thermal energy from the thermal store.

10. The heat pump of claim 1, wherein the first heat extraction unit comprises a heat exchanger that transfers to the working fluid heat from a low temperature heat source.

11. The heat pump of claim 10, where the low temperature heat source provides sufficient thermal energy to evaporate the working fluid.

12. The heat pump of claim 11, wherein the low temperature heat source is any of waste heat from an industrial process, thermal energy from the environment and hot water collected from solar thermal energy.

13. The heat pump of claim 10, wherein the working fluid is any of C6K perfluoroketone, propane, butane, isobutane, butene, pentane, isopentane, neopentane, D4, D5, D6, MDM, MD2M, MD3M, MD4M, or other hydrocarbon, perfluorocarbon, perfluoroketone, hydrofluorocarbon, hydrofluoroolefin, or siloxane.

14. The heat pump of claim 1, wherein the second heat extraction unit provides for any of direct and indirect heating of the working fluid by the second heat source.

15. The heat pump of claim 14, wherein the second heat extraction unit comprises a heat exchanger that transfers to the working fluid heat from the second heat source.

16. The heat pump of claim 15, wherein the second heat source is a high temperature solar thermal collector.

17. The heat pump of claim 1, wherein the thermal store comprises sand.

18. The heat pump of claim 1, operating in a charging cycle wherein
   G. the working fluid changes phase from liquid to gas as it absorbs heat from the first heat source in the first heat extraction unit temperature,
   H. the working fluid increases in temperature in any of the first compressor and the recuperator,
   I. the working fluid absorbs additional heat from the second heat source in the second heat extraction unit,
   J. the working fluid delivers heat to the thermal heat source, and
   K. the working fluid is subjected to a pressure drop in the pressure reduction stage, prior to re-entry to the first heat extraction unit.

19. The heat pump of claim 1, operating in a discharge cycle wherein the working fluid exchanges heat with a thermal sink.

20. The heat pump of claim 19, wherein the thermal sink is any of a heat engine and a heat extraction unit.

21. The heat pump of claim 1, comprising a second compressor coupled to the via and disposed on the fluid circuit between the second heat extraction unit and the thermal store.

22. The heat pump of claim 21, comprising the recuperator and the first and second compressors, wherein the recuperator is disposed on the fluid circuit to extract heat from working fluid exiting the thermal store during a charging cycle and to transfer that heat to working fluid exiting the first heat extraction unit.

23. The heat pump of claim 22, wherein the first compressor is disposed on the fluid circuit downstream of the recuperator, and the second compressor is disposed on the fluid circuit downstream of the second heat extraction unit.

24. The heat pump of claim 21, wherein the working fluid is any of low molecular weight hydrocarbon, siloxane, and hydrofluorocarbon.

* * * * *